US012731284B2

(12) United States Patent
Pan

(10) Patent No.: US 12,731,284 B2
(45) Date of Patent: Sep. 8, 2026

(54) POSE ESTIMATION APPARATUS, POSE ESTIMATION METHOD, AND NON-TRANSITORY COMPUTER-READABLE STORAGE MEDIUM

(71) Applicant: NEC Corporation, Tokyo (JP)

(72) Inventor: Yadong Pan, Tokyo (JP)

(73) Assignee: NEC CORPORATION, Tokyo (JP)

( * ) Notice: Subject to any disclaimer, the term of this patent is extended or adjusted under 35 U.S.C. 154(b) by 225 days.

(21) Appl. No.: 18/727,184

(22) PCT Filed: Jan. 21, 2022

(86) PCT No.: PCT/JP2022/002221
§ 371 (c)(1),
(2) Date: Jul. 8, 2024

(87) PCT Pub. No.: WO2023/139757
PCT Pub. Date: Jul. 27, 2023

(65) Prior Publication Data
US 2025/0095192 A1 Mar. 20, 2025

(51) Int. Cl.
*G06K 9/00* (2022.01)
*G06T 7/73* (2017.01)
(Continued)

(52) U.S. Cl.
CPC ................ *G06T 7/73* (2017.01); *G06V 10/82* (2022.01); *G06V 40/10* (2022.01); *G06T 2207/20084* (2013.01); *G06T 2207/30196* (2013.01)

(58) Field of Classification Search
None
See application file for complete search history.

(56) References Cited

U.S. PATENT DOCUMENTS

2015/0035750 A1* 2/2015 Bailey .................... G06V 40/28 345/158
2017/0221248 A1* 8/2017 Aguado .................. G06T 13/40
(Continued)

FOREIGN PATENT DOCUMENTS

CN 110909655 A 3/2020
CN 111310625 A 6/2020
(Continued)

OTHER PUBLICATIONS

International Search Report for PCT Application No. PCT/JP2022/002221, mailed on Apr. 5, 2022.
(Continued)

*Primary Examiner* — SJ Park
(74) *Attorney, Agent, or Firm* — Sughrue Mion, PLLC

(57) ABSTRACT

A pose estimation apparatus detects key-points from a target image in which one or more persons are captured, and computes one or more selection factors based on the key-points. The selection factor includes density, resolution, or both of persons in the target image. The pose estimation apparatus selects one of predefined multiple key-point association algorithms based on the selection factor. The pose estimation apparatus performs key-point association on the key-points using the selected algorithm to divide the key-points into one or more key-point groups each of which includes the key-points of the same person as each other. For each of the key-point groups, the pose estimation apparatus estimates a pose of the person corresponding to the key-point group based on the key-points included in the key-point group.

20 Claims, 12 Drawing Sheets

(51) Int. Cl.
*G06V 10/82* (2022.01)
*G06V 40/10* (2022.01)

(56) References Cited

U.S. PATENT DOCUMENTS

2018/0039745 A1* 2/2018 Chevalier .............. G16H 50/20
2019/0019030 A1 1/2019 Cansizoglu et al.
2021/0154582 A1* 5/2021 Takafuji ................ A63F 13/577

FOREIGN PATENT DOCUMENTS

CN 111368594 A 7/2020
JP 2021-157835 A 10/2021
WO 2021/014530 A1 1/2021

OTHER PUBLICATIONS

Written opinion for PCT Application No. PCT/JP2022/002221, mailed on Apr. 5, 2022.

* cited by examiner

POSE ESTIMATION APPARATUS, POSE ESTIMATION METHOD, AND NON-TRANSITORY COMPUTER-READABLE STORAGE MEDIUM

This application is a National Stage Entry of PCT/JP2022/002221 filed on Jan. 21, 2022, the contents of all of which are incorporated herein by reference, in their entirety.

TECHNICAL FIELD

The present disclosure generally relates to techniques to analyze an image to estimate a pose of the person captured in the image.

BACKGROUND ART

There are various types of analysis that are performed on an image in which one or more persons are captured. One of those analyses is pose estimation with which a pose of each person captured in the image is estimated. The pose of the person may be estimated based on key-points, such as joints of body, detected from the image.

In the case where multiple persons are captured in the image, pose estimation may include a process called "key-point association" to divide the key-points into groups so that each group includes the key-points that belong to the same person as each other. PTL1 discloses one of algorithms for key-point association.

CITATION LIST

Patent Literature

PTL1: International Patent Publication No. WO2021/014530

SUMMARY OF INVENTION

Technical Problem

There are multiple algorithms for key-point association, and there is no algorithm that is the most suitable in every situation. An objective of the present disclosure is to provide a novel technique to accurately estimate poses of the persons captured in an image.

Solution to Problem

The present disclosure provides a pose estimation apparatus that comprises at least one memory that is configured to store instructions and at least one processor. The processor is configured to execute the instructions to: acquire a target image in which one or more persons are captured; detect key-points from the target image; compute one or more selection factors based on the key-points, the one or more selection factors including density, resolution, or both of persons in the target image; select an algorithm for key-point association from predefined algorithms for key-point association based on the one or more selection factors; perform key-point association on the key-points using the selected algorithm to divide the key-points into one or more key-point groups each of which includes the key-points of a same person as each other; and for each of the key-point groups, estimate a pose of the person corresponding to the key-point group based on the key-points included in the key-point group.

The present disclosure further provides a pose estimation method that is performed by one or more computers. The method comprises: acquiring a target image in which one or more persons are captured; detect key-points from the target image; computing one or more selection factors based on the key-points, the one or more selection factors including density, resolution, or both of persons in the target image; selecting an algorithm for key-point association from predefined algorithms for key-point association based on the one or more selection factors; performing key-point association on the key-points using the selected algorithm to divide the key-points into one or more key-point groups each of which includes the key-points of a same person as each other; and for each of the key-point groups, estimating a pose of the person corresponding to the key-point group based on the key-points included in the key-point group.

The present disclosure further provides a non-transitory computer readable storage medium storing a program. The program that causes one or more computers to execute: A pose estimation method performed by one or more computers comprising: acquiring a target image in which one or more persons are captured; detect key-points from the target image; computing one or more selection factors based on the key-points, the one or more selection factors including density, resolution, or both of persons in the target image; selecting an algorithm for key-point association from predefined algorithms for key-point association based on the one or more selection factors; performing key-point association on the key-points using the selected algorithm to divide the key-points into one or more key-point groups each of which includes the key-points of a same person as each other; and for each of the key-point groups, estimating a pose of the person corresponding to the key-point group based on the key-points included in the key-point group.

Advantageous Effects of Invention

According to the present disclosure, a novel technique to accurately estimate poses of the persons in an image.

DESCRIPTION OF EMBODIMENTS

Example embodiments according to the present disclosure will be described hereinafter with reference to the drawings. The same numeral signs are assigned to the same elements throughout the drawings, and redundant explanations are omitted as necessary. In addition, predetermined information (e.g., a predetermined value or a predetermined threshold) is stored in advance in a storage device to which a computer using that information has access unless otherwise described.

First Example Embodiment

<Overview>

Figure 1:
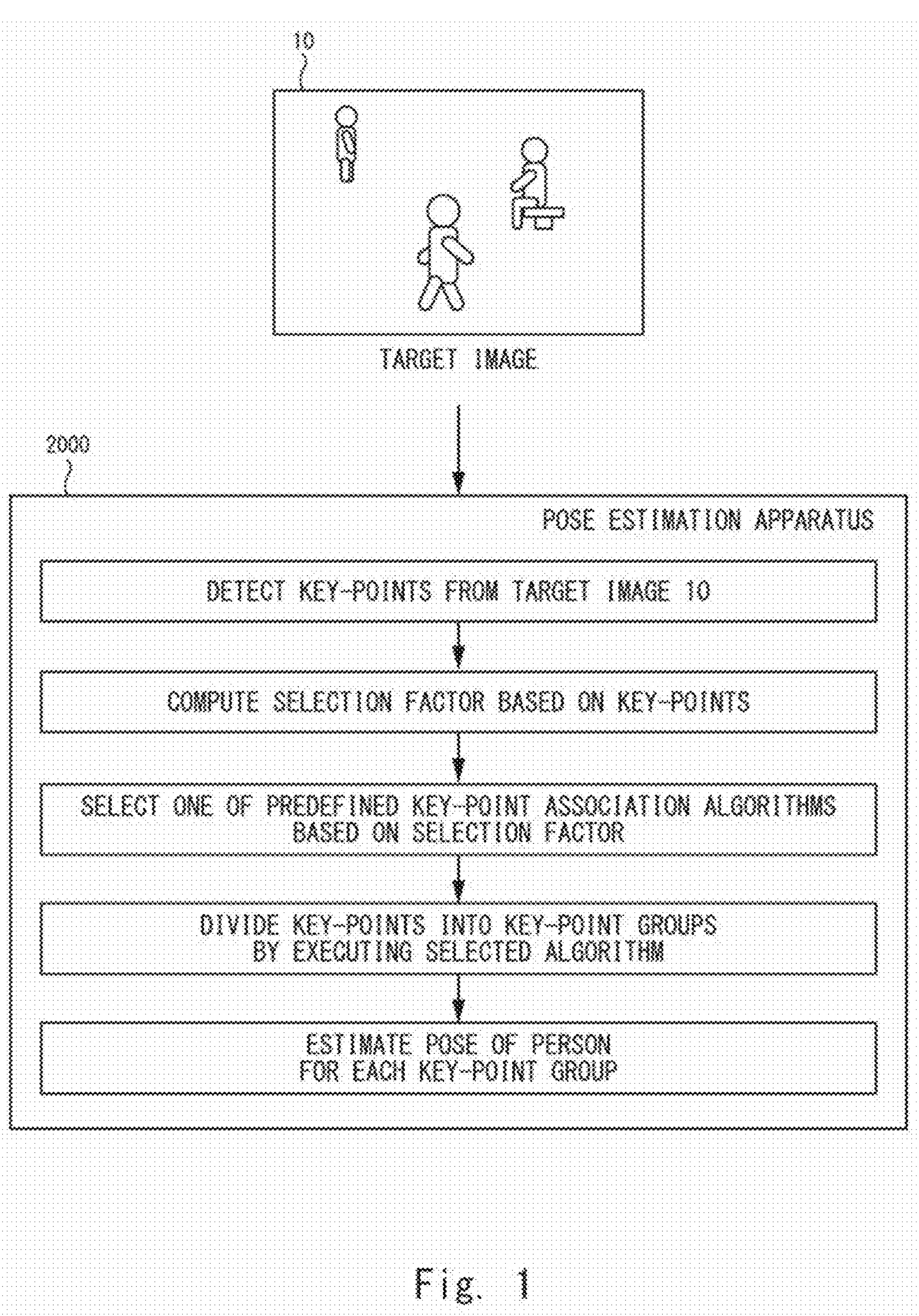
FIG. 1 illustrates an overview of a pose estimation apparatus of the first example embodiment.

FIG. 1 illustrates an overview of a pose estimation apparatus 2000 of the first example embodiment. It is noted that the overview illustrated by FIG. 1 shows an example of operations of the pose estimation apparatus 2000 to make it easy to understand the pose estimation apparatus 2000, and does not limit or narrow the scope of possible operations of the pose estimation apparatus 2000.

The pose estimation apparatus 2000 acquires a target image 10 in which one or more persons are captured, and estimates a pose of the respective persons. To do so, the pose estimation apparatus 2000 detects key-points from the target image 10 and performs key-point association on the detected key-points. The key-point may indicate a characteristic point of human's body, such as joint. The key-point association is a process to divide the key-points into groups so that each group includes the key-points that belong to the same person as each other. The pose of each person can be estimated based on the key-points that are determined to belong to that person through key-point association.

There are multiple algorithms for key-point association, and it depends on an image to be analyzed which algorithm is suitable to estimate the poses of the persons captured in that image. Hereinafter, algorithms for key-point association are called "key-point association algorithms". Thus, the pose estimation apparatus 2000 computes factors related to the target image 10 to select a key-point association algorithm for the target image 10 from predefined multiple key-point association algorithms. Hereinafter, this factor is called "selection factor". The selection factors may include density, resolution, or both of persons in the target image 10.

The pose estimation apparatus 2000 executes the selected key-point association algorithm on the key-points detected from the target image 10, thereby obtaining groups of key-point (hereinafter, key-point group); each key-point group includes the key-points that are estimated to belong to the same person as each other. Then, for each key-point group, the pose estimation apparatus 2000 determines the pose of the person corresponding to the key-point group based on the key-points included in the key-point group.

<Example of Advantageous Effect>

There are various key-point association algorithms, and there is no algorithm that is the most suitable in every situation. According to the pose estimation apparatus 2000, key-point association algorithm that is applied to the target image 10 is not fixed, but selected from predefined multiple key-point association algorithms based on the selection factor. The selection factor may include the density, resolution, or both of the person captured in the target image 10. Thus, the key-point association algorithm to be applied to the target image 10 is appropriately selected based on the density, resolution, or both of the person captured in the target image 10. Therefore, it is possible to accurately estimate the poses of the persons in the target image 10.

Hereinafter, more detailed explanation of the pose estimation apparatus 2000 will be described.

<Example of Functional Configuration>

Figure 2:
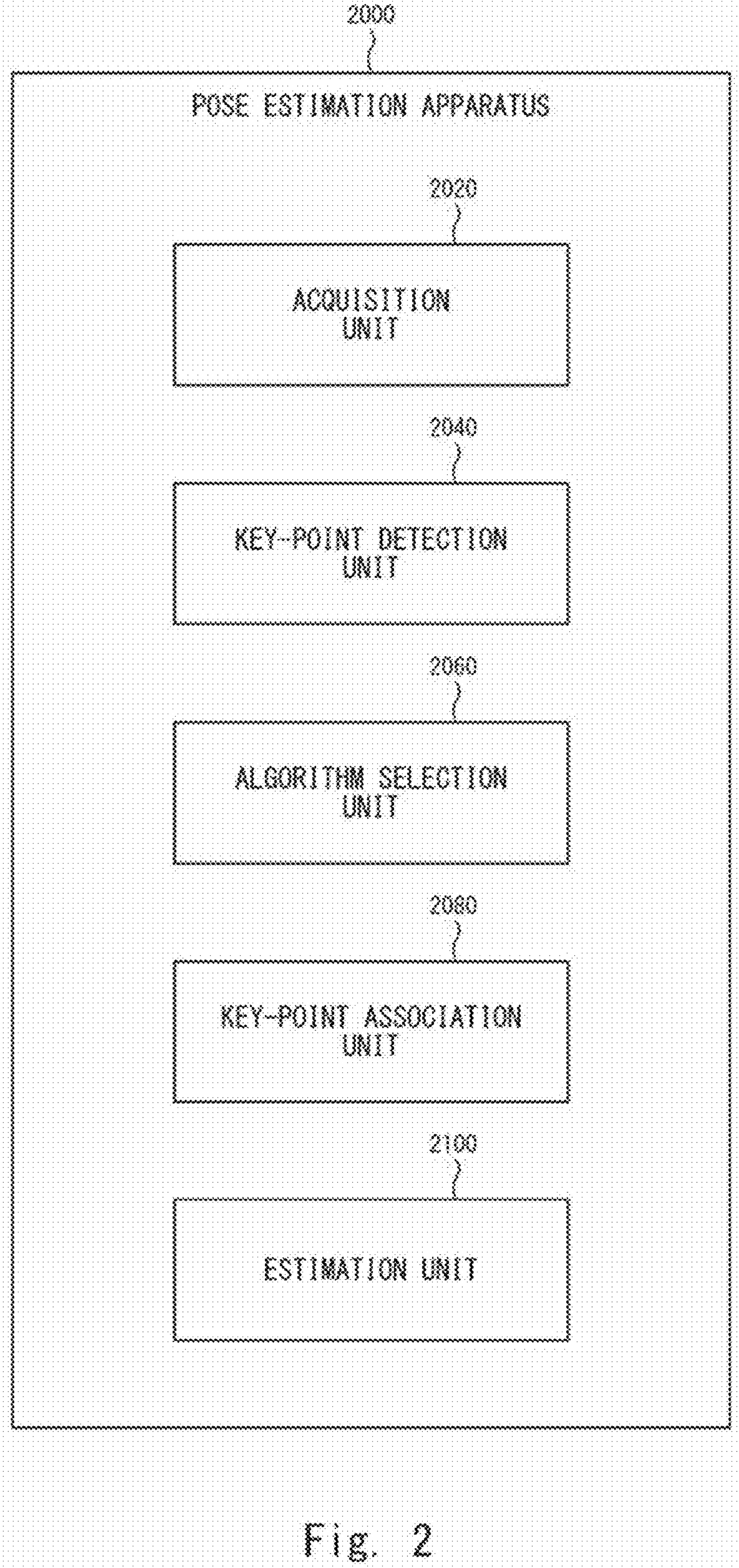
FIG. 2 is a block diagram illustrating an example of a functional configuration of the pose estimation apparatus of the first example embodiment.

FIG. 2 is a block diagram illustrating an example of the functional configuration of the pose estimation apparatus 2000 of the first example embodiment. The pose estimation apparatus 2000 includes an acquisition unit 2020, a key-point detection unit 2040, an algorithm selection unit 2060, a key-point association unit 2080, and an estimation unit 2100. The acquisition unit 2020 acquires the target image 10. The key-point detection unit 2040 detects the key-points from the target image 10. The algorithm selection unit 2060 computes one or more selection factors, and selects the key-point association algorithm from the predefined ones based on the computed selection factors. The key-point association unit 2080 executes the selected key-point association algorithm on the detected key-points, thereby generating key-point groups. For each of the key-point group, the estimation unit 2100 estimates a pose of the person corresponding to the key-point group based on the key-points in the key-point group.

<Example of Hardware Configuration>

The pose estimation apparatus 2000 may be realized by one or more computers. Each of the one or more computers may be a special-purpose computer manufactured for implementing the pose estimation apparatus 2000, or may be a general-purpose computer like a personal computer (PC), a server machine, or a mobile device.

The pose estimation apparatus 2000 may be realized by installing an application in the computer. The application is implemented with a program that causes the computer to function as the pose estimation apparatus 2000. In other words, the program is an implementation of the functional units of the pose estimation apparatus 2000.

Figure 3:
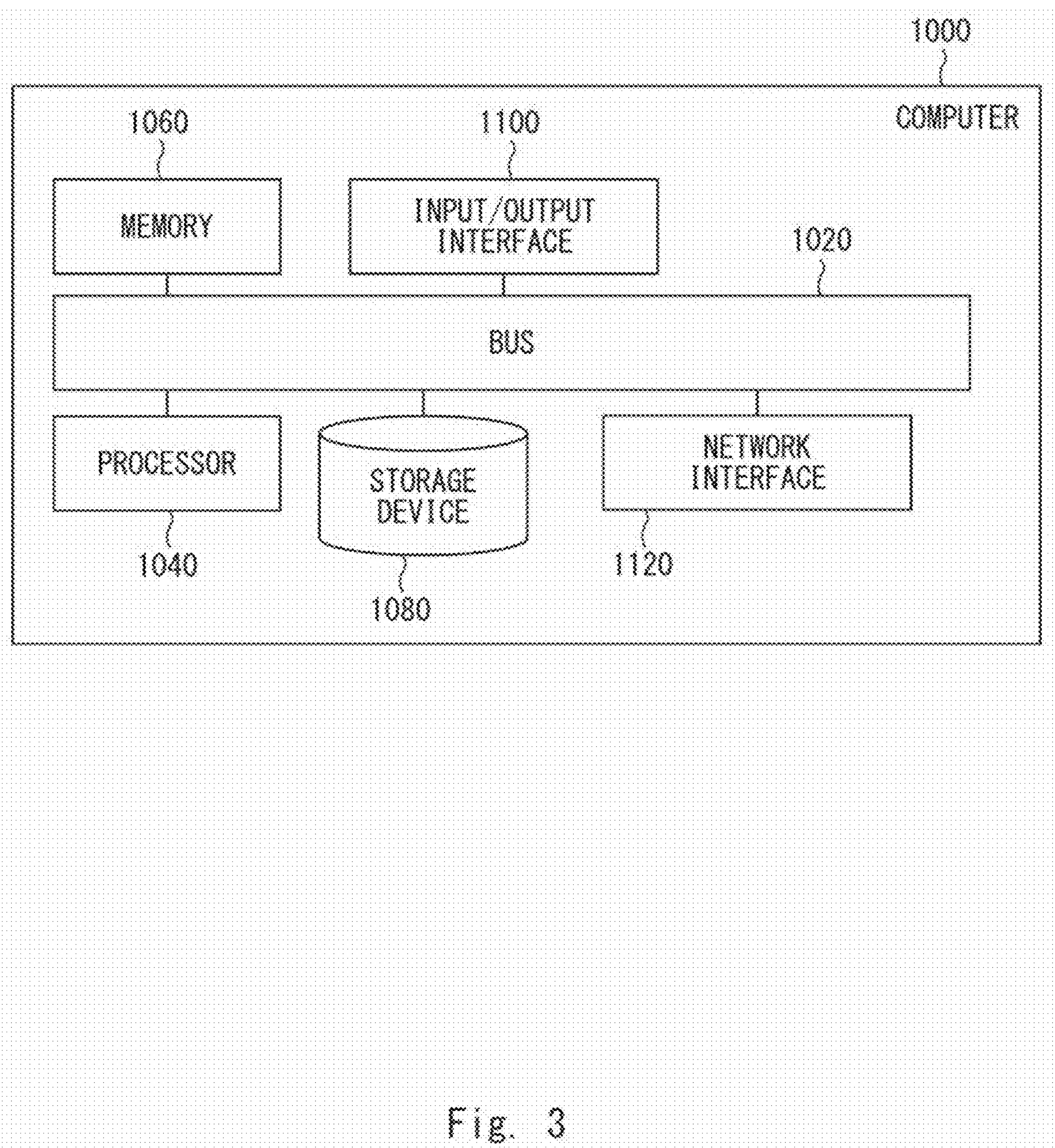
FIG. 3 is a block diagram illustrating an example of a hardware configuration of the pose estimation apparatus of the first example embodiment.

FIG. 3 is a block diagram illustrating an example of the hardware configuration of a computer 1000 realizing the pose estimation apparatus 2000 of the first example embodiment. In FIG. 3, the computer 1000 includes a bus 1020, a processor 1040, a memory 1060, a storage device 1080, an input/output (I/O) interface 1100, and a network interface 1120.

The bus 1020 is a data transmission channel in order for the processor 1040, the memory 1060, the storage device 1080, and the I/O interface 1100, and the network interface 1120 to mutually transmit and receive data. The processor 1040 is a processer, such as a CPU (Central Processing Unit), GPU (Graphics Processing Unit), or FPGA (Field-Programmable Gate Array). The memory 1060 is a primary memory component, such as a RAM (Random Access Memory) or a ROM (Read Only Memory). The storage device 1080 is a secondary memory component, such as a hard disk, an SSD (Solid State Drive), or a memory card. The I/O interface 1100 is an interface between the computer 1000 and peripheral devices, such as a keyboard, mouse, or display device. The network interface 1120 is an interface between the computer 1000 and a network. The network may be a LAN (Local Area Network) or a WAN (Wide Area Network).

The hardware configuration of the computer 1000 is not restricted to that shown in FIG. 3. For example, as mentioned-above, the pose estimation apparatus 2000 may be realized by plural computers. In this case, those computers may be connected with each other through the network.

<Flow of Process>

Figure 4:
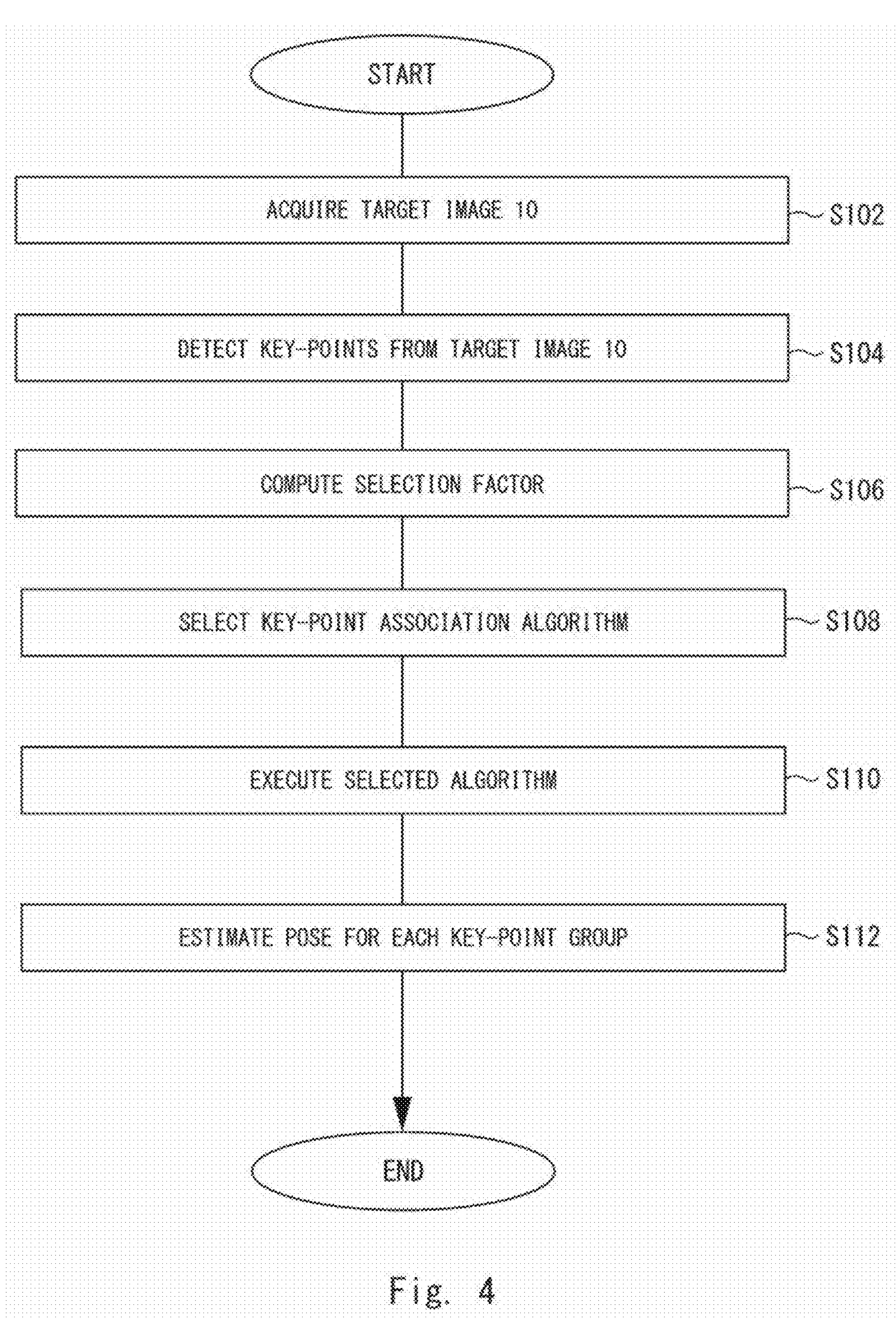
FIG. 4 is a flowchart illustrating an example flow of processes performed by the pose estimation apparatus of the first example embodiment.

FIG. 4 is a flowchart illustrating an example flow of processes performed by the pose estimation apparatus 2000 of the first example embodiment. The acquisition unit 2020 acquires the target image 10 (S102). The key-point detection unit 2040 detects the key-points from the target image 10 (S104). The algorithm selection unit 2060 computes one or more selection factors (S106). The algorithm selection unit 2060 selects the key-point association algorithm from the predefined ones based on the computed selection factors (S108). The key-point association unit 2080 execute the selected algorithm on the detected to generate the key-point groups (S110). The estimation unit 2100 estimates a pose of person for each key-point group (S112).

<Acquisition of Target Image 10: S102>

The acquisition unit 2020 acquires the target image 10. There are various ways to acquire the target image 10. In some embodiments, the target image 10 is stored in advance in a storage device in a manner that the pose estimation apparatus 2000 can acquire it. In this case, the acquisition unit 2020 may access the storage device to acquire the target image. In other embodiments, the target image 10 may be sent by another computer, such as a camera that generates the target image 10. In this case, the acquisition unit 2020 may acquire the target image 10 by receiving it.

In some embodiments, the target image 10 may be one of sequential images, such as video frames forming a video. In this case, the pose estimation apparatus 2000 may acquire all or a part of sequential images as the target images 10, and estimates the poses of the respective person for each of the target images 10.

<Detection of Key-Points: S104>

The key-point detection unit 2040 detects the key-points from the target image 10 (S104). There are various ways to detect key-points of person from an image, and the key-point detection unit 2040 may use one of those ways to detect the key-points from the target image 10. The key-point of person may be one or more features of human's body, such as joints at the neck, shoulders, elbows, wrists, waist, knees, ankles, etc.

In some embodiments, the key-point detection unit 2040 has a machine learning-based model (e.g., a neural network) that is configured to take an image as input and trained in advance to detect key-points from the input image in response to the image being input thereto. Hereinafter, this model is called "key-point detection model".

The key-point detection model may take the target image 10 as input, extracts features from the target image 10, detects one or more key-points from the target image 10 based on the extracted features, and determine the class of each key-point (e.g., neck, right shoulder, etc.) based on the extracted features. In this case, the key-point detection model may include a first model that is trained in advance to extract the features from the target image 10, and a second model that is trained in advance to detect and classify the key-points based on the features extracted from the target image 10. Each of the first model and the second model may be configured as a machine learning-based model, such as a neural network. It is noted that there are various types of machine-learning models that can detect key-points from an input image and classify them, and the key-point detection model can be configured as one of such models.

<Computation of Selection Factors: S106>

In order to select the key-point association algorithm suitable for the target image 10, the algorithm selection unit 2060 computes the selection factors based on the detected key-points (S106). As mentioned above, the selection factor may include the density of persons in the target image 10, the resolution of persons in the target image 10, or both. Hereinafter, example ways of computing those factors will be described.

<<Density of Persons>>

In the case where the density of persons is used as a selection factor, the algorithm selection unit 2060 computes the density of persons in the target image 10 based on the key-points that are detected from the target image 10. The density of persons may be measured using the key-points of right shoulder and left shoulder.

Figure 5:
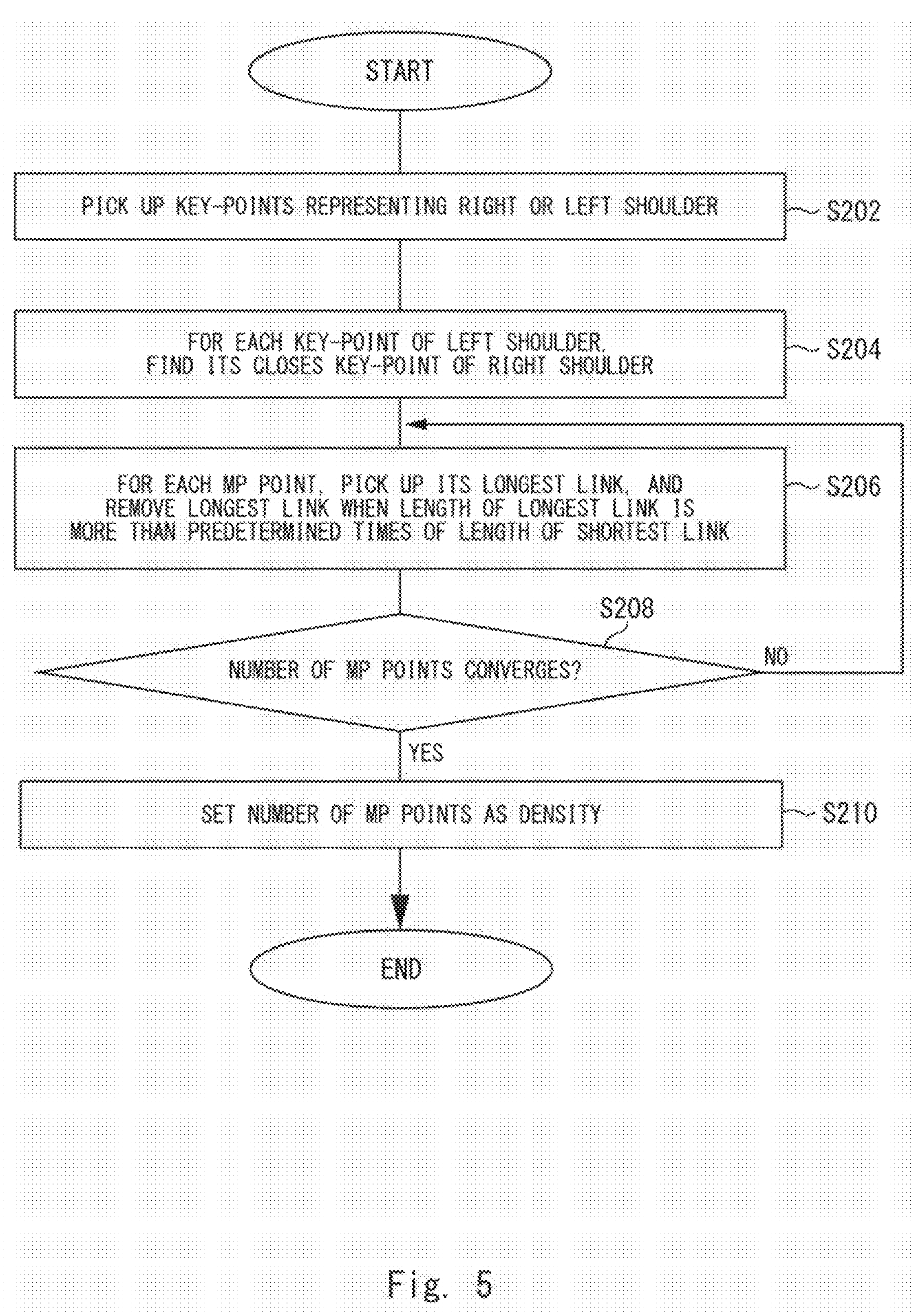
FIG. 5 is a flowchart illustrating an example way of computing the density of persons in the target image.

FIG. 5 is a flowchart illustrating an example way of computing the density of persons in the target image 10. The algorithm selection unit 2060 picks up the key-points that represent left shoulder or right shoulder from all detected key-points (S202). Then, for each key-point of left shoulder, the algorithm selection unit 2060 finds its closest key-point of right shoulder and link them (S204). With this step, some key-points of right shoulder may be linked with multiple key-points of left shoulder.

For each MP point, the algorithm selection unit 2060 picks up the longest and shortest links each of which has the MP point as one of its ends, and removes the longest link when the length of the longest link is more than a predetermined times (e.g., two times) of the length of the shortest one (S206). With this step, some MP points may become non-MP points (i.e., key-points of right shoulder linked with only a single key-point of left shoulder) as the result of the removal of the longest link.

Figure 6:
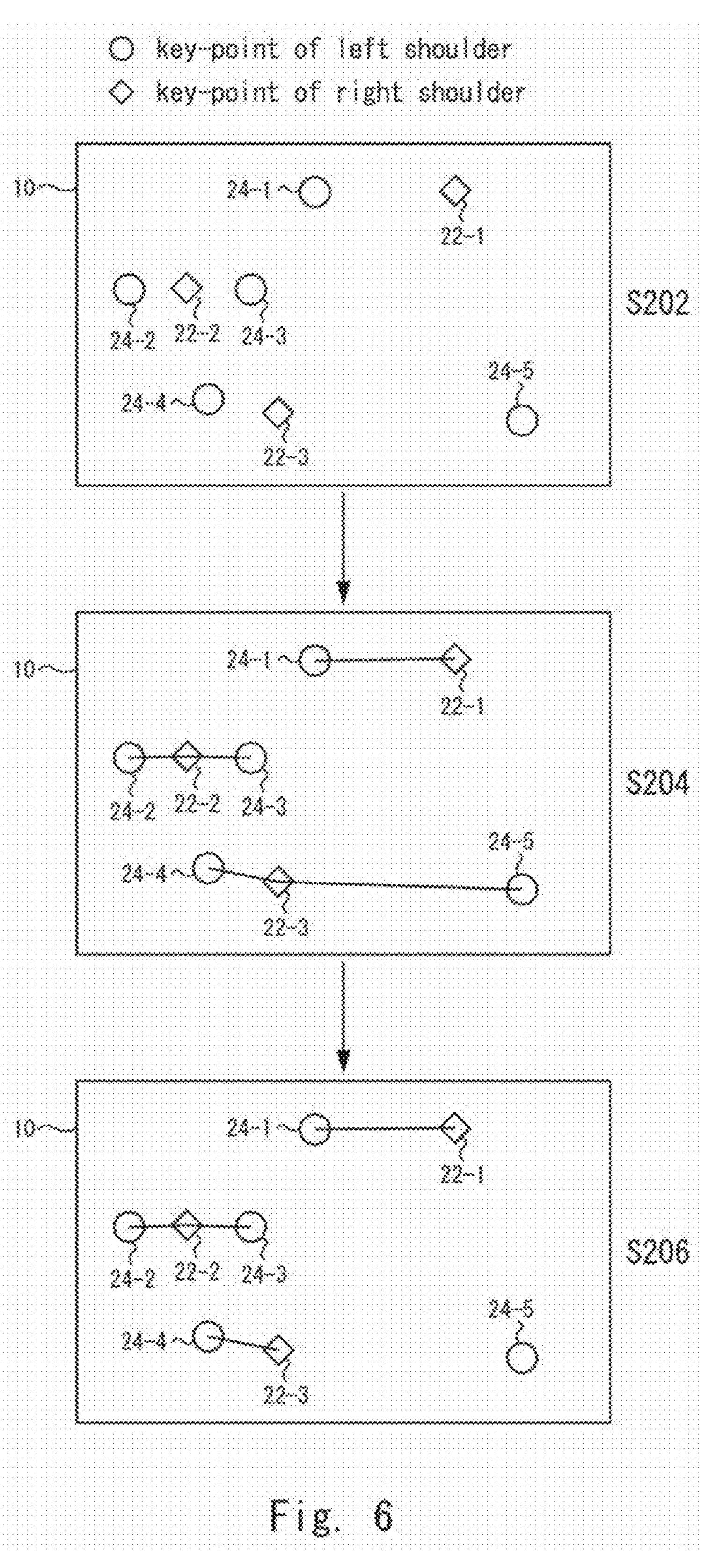
FIG. 6 illustrates an example case of Steps 202 to 206.

FIG. 6 illustrates an example case of Steps 202 to 206. In this example, three right shoulders 22-1 to 22-3 and five left shoulders 24-1 to 24-5 are detected in Step S202. Next, the left shoulders 24-1 to 24-5 are linked with the right shoulders 22-1, 22-2, 22-2, 22-3, and 22-3 respectively in Step S204. In this case, the right shoulders 22-2 and 22-3 are MP points.

In Step S206, regarding the right shoulder 22-3, it is determined that the length of the longest link, which is between the right shoulder 22-3 and the left shoulder 24-5, is more than the predetermined times of the length of the shortest link, which is between the right shoulder 22-3 and the left shoulder 24-4. Thus, the link between the right shoulder 22-3 and the left shoulder 24-5 is removed. As the result of this removal, the right shoulder 22-3 becomes a non-MP point.

Step S206 is repeated until the number of the MP points converges (e.g., becomes constant). Hereinafter, the number of the MP points is called "NMP". Specifically, the algorithm selection unit 2060 determines whether or not NMP converges (S208). In the case where NMP does not converge yet (S208: NO), Step S206 is performed again. On the other hand, in the case where NMP converges (S208: YES), the algorithm selection unit 2060 sets NMP as the density of persons in the target image 10. Conceptually, the larger NMP is, the denser the persons are in the target image 10.

In other implementations, the algorithm selection unit 2060 may compute the density of persons in the target image 10 based on NMP. For example, a function that outputs a value proportional to an input value is defined in advance for the computation of the density. In this case, the algorithm selection unit 2060 may input NMP to this function to obtain an output value that is proportional to NMP, and uses this output value as the density of persons in the target image 10.

<<Resolution of Persons>>

In the case where the resolution of persons is used as a selection factor, the algorithm selection unit 2060 may compute the resolution of persons based on NMP mentioned above. Specifically, from the MP points remained after Step S208 of FIG. 5, the algorithm selection unit 2060 picks up the links whose length is less than a threshold that may be defined based on one of dimensions of the target image: e.g., 1/25 of the width of the target image 10. The links picked up here are called "SL links".

The algorithm selection unit 2060 may compute a value called RSL as follows:

Equation 1

$$RSL = \begin{cases} \frac{NSL}{NAL} & (\text{if } NAL > 0) \\ 0 & (\text{if } NAL = 0) \end{cases} \quad (1)$$

In the equation (1), NSL represents the number of the SL links, and NAL represents the number of all of the links that have the MP point as one of their ends.

Conceptually, the larger RSL is, the lower resolution of persons in the target image 10. Thus, in some implementations, the algorithm selection unit 2060 may compute the resolution of persons in the target image 10 as a value that becomes larger as RSL becomes smaller. For example, a function that outputs a value proportional to the reciprocal of an input value in advance for the computation of the resolution. In this case, the algorithm selection unit 2060 may input RSL to this function to obtain an output value that is proportional to 1/RSL, and uses this output value as the resolution of persons in the target image 10. It is noted that this function may be defined to output the maximum value when given 0 as input.

In other implementations, the algorithm selection unit 2060 may use RSL as a selection factor that represents the resolution of persons in the target image 10. In this case, when determining whether or not the resolution of persons in the target image 10 is less than a threshold as described later, the algorithm selection unit 2060 may determine that the resolution of persons in the target image 10 is less than the threshold if RSL is larger than the threshold.

<Key-point Association Algorithms>

The predefined key-point association algorithms may include two or more of 1) mid-point algorithm, 2) direction map algorithm, and 3) location map algorithm. Hereinafter, each algorithm is explained.

<<Mid-Point Algorithm>>

The mid-point algorithm detects mid-points from the target image 10 to perform key-point association. The mid-point is a point located in the middle of two key-points. The detail of the mid-point algorithm is disclosed by PTL1.

The mid-point algorithm may be implemented using a machine learning-model, such as a neural network. Hereinafter, this machine-learning model is called "mid-point model". The mid-point model may be configured to take the target image 10 as input, and trained in advance to output mid-points in the target image 10 in response to the input data being input thereto.

The mid-point algorithm may input the target image 10 into the mid-point model to obtain the mid-points in the target image 10. Then, the mid-point algorithm divides the key-points into the key-point groups based on the mid-points.

<<Direction Map Algorithm>>

The direction map algorithm generates a direction map of the target image 10, and divides the key-points into the key-point groups using the direction map for key-point association. The direction map is a feature map extracted from the target image 10, and has the same size as the target image 10. The direction map indicates a unit vector for each pixel in a region of a person (hereinafter, person region) in the target image 10. The unit vector corresponding to a pixel in the person region points from that pixel to a predefined reference point of that person region. The reference point of a person region may be a specific key-point (e.g., a key-point of the neck) of the person corresponding to the person region.

More specifically, the direction map may include a set of two feature maps, called H-direction map and V-direction map. In the H-direction map, pixels in the person region indicates a horizontal component (i.e., x-component) of the unit vector corresponding thereto. On the other hand, in the V-direction map, pixels in the person region indicates a vertical component (y-component) of the unit vector corresponding thereto.

The direction map algorithm may be implemented using a machine learning-model, such as a neural network. Hereinafter, this machine-learning model is called "direction map model". The direction map model may be configured to take the target image 10 as input, and trained in advance to output a direction map of the target image 10 in response to the input data being input thereto. The direction map algorithm may input the target image 10 into the direction map model to obtain the direction map. Then, the direction map algorithm divides the key-points into the key-point groups using the direction map.

The direction map algorithm computes a score for each pair of the key-point and the person detected from the target image 10 using the direction map, and determines which key-point belongs to which person based on the computed score. Then, for each key-point, the direction map algorithm determines that that key-point belongs to the person corresponding to the largest score of the scores with respect to that key-point.

Suppose that a pair of the key-point K1 and the person P1 has the score S1, a pair of the key-point K1 and the person P2 has the score S2, and a pair of the key-point K1 and the person P3 has the score S3. In addition, the largest score of S1, S2, and S3 is S2. In this case, the direction map algorithm determines that the key-point K1 belongs to the person P2 since the pair of the key-point K1 and the person P2 has the largest score.

The score of a pair of the key-point and the person may be computed as a product of three factors OB, RoD, and D: i.e., S=OB*RoD*D. These three factors are computed as follows. The direction map algorithm generates one or more intermediate points on a line between the key-point and the reference point of the person. The direction map algorithm determines whether or not the intermediate point is located in the person region for each intermediate point. The direction map algorithm computes, as the factor OB, what percentage of the intermediate points is located in the person region. For example, if two of three intermediate points are located in the person region, the factor OB is 2/3.

Then, for each of the intermediate points that are located in the person region, the direction map algorithm obtains the unit vector corresponding to that intermediate point from the direction map. Suppose that coordinates of the intermediate point on the target image 10 is (x1, y1). In this case, the unit vector corresponding to the intermediate point is one at (x1, y1) of the direction map. The direction map algorithm also obtains the unit vector corresponding to the key-point.

The direction map algorithm computes, as the factor RoD, a variation of direction of the unit vectors obtained. The variation of direction of the unit vectors represents maximum difference between two of those unit vectors.

As the factor D, the direction map algorithm computes the distance between the key-point and the reference point of the person.

<<Location Map Algorithm>>

The location map algorithm computes a location map of the target image 10, and divides the key-points into the key-point groups using the location map for key-point association. The location map is a feature map extracted from the target image 10, and have the same size as the target image 10. In the location map, pixels in a person region indicates a relative position of the person region. The relative position of the person region is a position of a reference point (such as, the key-point of the neck) relative to a base position of the target image 10. The base position of the target image 10 may be an origin (e.g., the top-left corner) thereof.

More specifically, the location map may include two feature maps, called H-location map and V-location map. In the H-location map, pixels in the person region indicate a horizontal position of the reference point of that person region relative to the base position (e.g., the left end of the target image 10). On the other hand, in the V-location map, pixels in the person region indicate a vertical position of the reference point of that person region relative to the base position (e.g., the top end of the target image 10).

Suppose that the width and height of the target image 10 are W and H respectively, and an absolute coordinate of the reference point of a person region is (x1, y1) in the target image 10. In this case, the relative position of the person region is (x1/W, y1/H). Thus, pixels in this person region indicate x1/W in the H-location map while they indicate y1/H in the V-location map.

The location map algorithm may be implemented using a machine learning-model, such as a neural network. Hereinafter, this machine-learning model is called "location map model". The location map model may be configured to take the target image 10 as input, and trained in advance to output a location map of the target image 10 in response to the input data being input thereto. The location map algorithm may input the target image 10 into the location map model to obtain the location map. Then, the location map algorithm divides the key-points into the key-point groups using the location map.

For each key-point detected from the target image 10, the location map algorithm computes a distance from each person detected from the target image 10. The distance is computed using the relative positions of the key-point and the person that are obtained from the location map.

Specifically, the location map algorithm obtains a pixel value from the pixel of the location map whose coordinates on the location map are the same as those of the key-point on the target image 10, and uses the obtained value as the relative position of the key-point. Suppose that coordinates of a key-point K1 is (x1, y1) in the target image 10. In addition, the pixel at (x1, y1) in the H-location map indicates x2 while the pixel at (x1, y1) in the V-location map indicates y2. In this case, the location map algorithm obtains a pixel value x2 from the pixel at (x1, y1) in the H-location map as an x-coordinate of the relative position of the key-point K1. In addition, the location map algorithm obtains a pixel value y2 of the pixel at (x1, y1) in the V-location map as a y-coordinate of the relative position of the key-point K1. As a result, the relative position of the key-point K1 is determined to be (x2, y2).

Regarding the relative position of the person, the location map algorithm obtains a pixel value from a pixel in the person region corresponding to that person, and uses the obtained value as the relative position of the person. Suppose that pixels in the person region of a person P1 indicate a value x3 in the H-location map while pixels in the person region of the person P1 indicate a value y3 in the V-location map. In this case, the relative position of the person P1 is determined to be (x3, y3). When the relative position of the key-point is denoted by (x2, y2) as mentioned above, the location map algorithm computes the distance between (x2, y2) and (x3, y3) as the distance between the key-point and the person P1.

After computing the distance to each person for the key-points, the location map algorithm determines the person whose distance from the key-point is shortest of all. Then, the location map determines that the key-point belongs to the determined person.

<Configuration of Models>

<<As to Direction Map Model>>

Direction map is a feature map that describes a geometric relationship between the reference point (such as the key-point of the neck) and any other pixel in the person's full body area. To have good quality of direction map, it is preferable that the direction map model understands well the person's body context (i.e., the way of connection among different body parts). The mid-point, which is defined as the middle of two pairwise key-points, can help the direction map model better understands the connection between different body parts, and therefore help to enhance the quality of direction map.

Based on the above insight, it is preferable that the direction map is configured to generate the direction map using the key-points and the mid-points detected from the target image 10. Thus, when the mid-point algorithm and the direction map model algorithm are employed as the predefined key-point association algorithms, the direction map model can be configured to take not only the target image 10 but also the output of the mid-point model as input. In this case, the mid-point model and the direction map model can be collectively trained using the same training data as each other. It is noted that the mid-point model may also have a function as the key-point detection model to detect the key-points from the target image 10.

Figure 7:
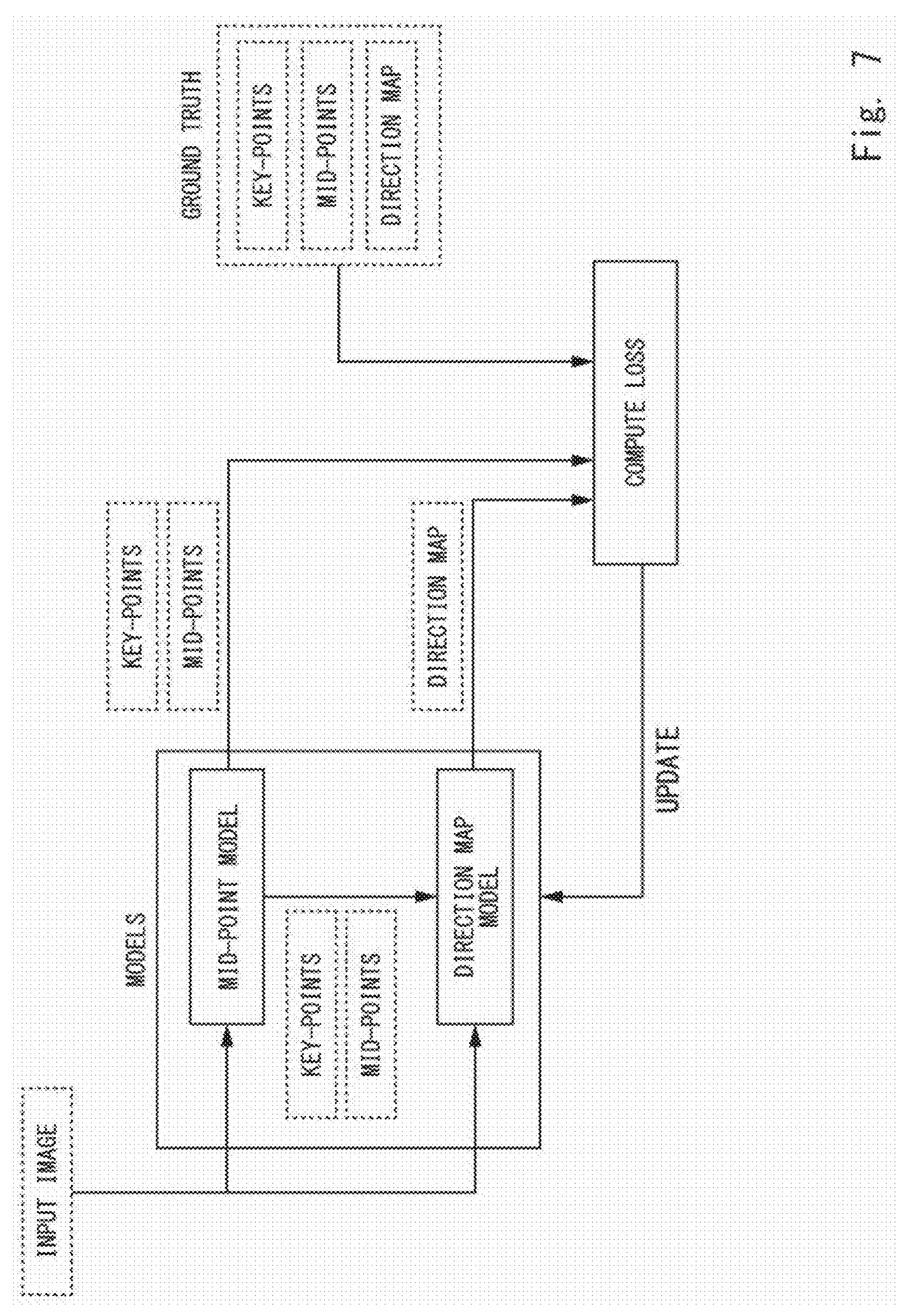
FIG. 7 illustrates the training of the mid-point model and the direction map model.

FIG. 7 illustrates the training of the mid-point model and the direction map model. In this example, the mid-point model takes the target image 10 as input and detects the key-points and the mid-points from the target image 10. The direction map model is connected to the mid-point model so that the direction map model can take the output of the mid-point (i.e., the key-points and the mid-points) as input.

The training data for the training of the models shown by FIG. 7 includes a set of an input image in which one or more persons are captured and the ground truth data. The ground truth data indicates the key-points and mid-points to be detected from the corresponding input image, and direction map to be generated from the corresponding input image. The models are trained by computing a loss representing a degree of difference between their output (i.e., the key-points and mid-points detected by the mid-point model, and the direction map generated by the direction map model) and the ground truth data, and updating trainable parameters of the models based on the computed loss.

<<As to Location Map Model>>

For any pixel in a person's body area except the reference point, its values in the person's two direction maps (denoted by vx and vy, respectively) are the X- and Y-component of unit vector from the pixel to the reference point. Therefore, vx and vy satisfies the condition of "vx^2+vy^2=1"; this means that, for all pixels in the person's body area except the reference point, the sum of square of vx and vy is a constant value. On the other hand, location map is defined as filling a person's body area with a constant value corresponding to the person's location in the image.

Therefore, the square of direction map can help enhance the quality of location map by making values of all pixels in the person body area convergent to a constant value. It is noted that the square of direction map includes the square of the H-direction map, in which each pixel indicates the square of the value indicated by the corresponding pixel in the H-direction map, and the square of the V-direction map, in which each pixel indicates the square of the value indicated by the corresponding pixel in the V-direction map.

Based on the above insight, it is preferable to configure the location map model to generate the location map using the square of direction map. Thus, when the direction map model algorithm and the location map algorithm are employed as the predefined key-point association algorithms, the location map model can be configured to take not only the target image 10 but also the square of the output of the direction map model as input. In this case, the direction map model and the location map can be collectively trained using the same training data as each other.

Figure 8:
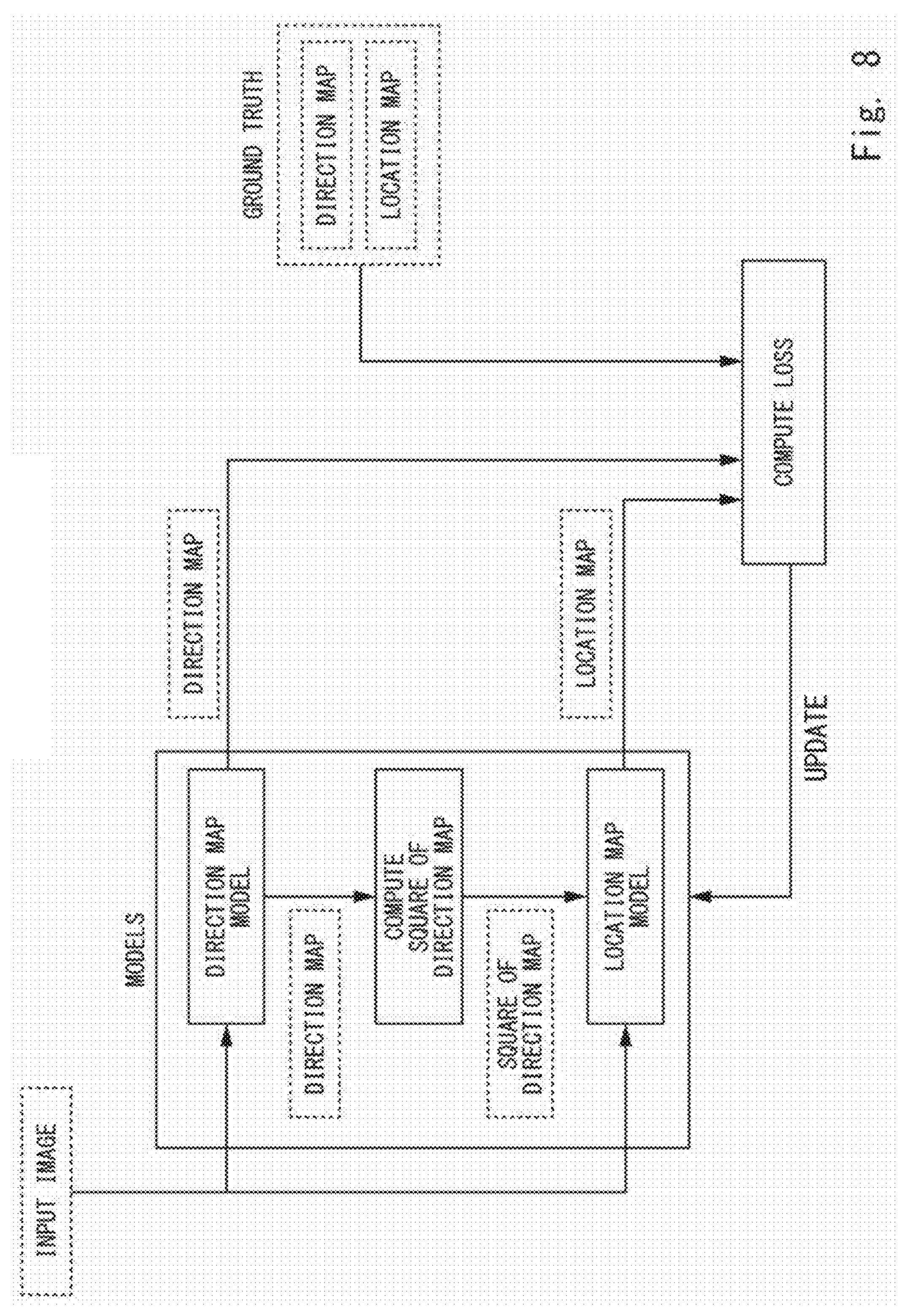
FIG. 8 illustrates the training of the direction map model and the location map model.

FIG. 8 illustrates the training of the direction map model and the location map model. In this example, there is a unit that computes the square of the output of the direction map model between the direction map model and the location map model. This unit is configured to take the output of the direction map model, compute the square of this output, and feeds the result of the computation to the location map model.

The training data for the training of the models shown by FIG. 8 includes a set of an input image in which one or more persons are captured and the ground truth data. The ground truth data indicates the direction map and the location map to be generated from the corresponding input image. The models are trained by computing a loss representing a degree of difference between their output (i.e., the direction map generated by the direction map model and the location map generated by the location map model) and the ground truth data, and updating trainable parameters of the models based on the computed loss.

Figure 9:
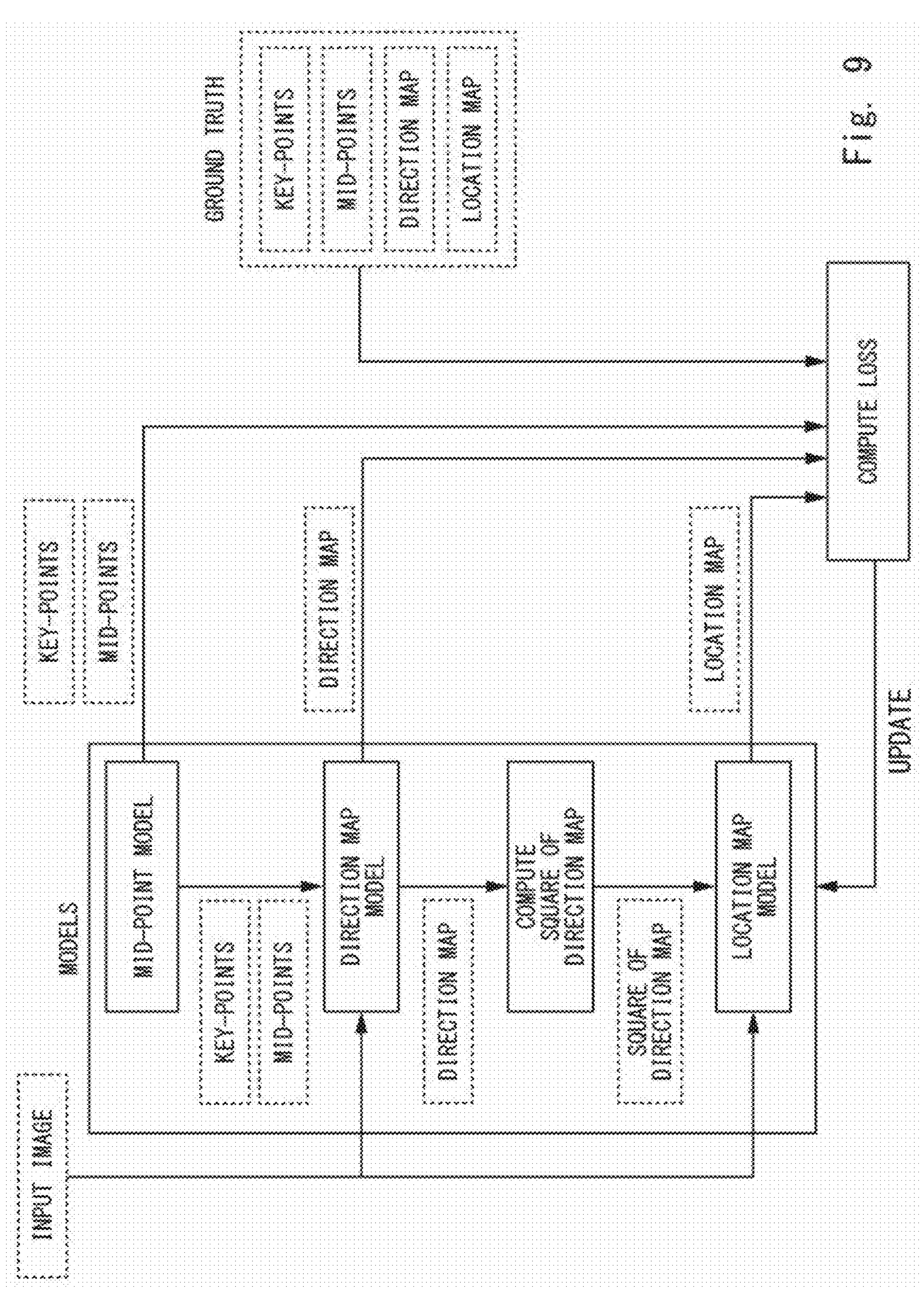
FIG. 9 illustrates the training of the mid-point model, the direction map model, and the location map model.

By combing the configurations shown by FIG. 7 and FIG. 8, the mid-point model, the direction map model, and the location map model can be collectively trained when those models are employed as the predefined key-point association algorithms. FIG. 9 illustrates the training of the mid-point model, the direction map model, and the location map model.

The training data for the training of the models shown by FIG. 9 includes a set of an input image in which one or more persons are captured and the ground truth data. The ground truth data indicates the key-points and the mid-points to be detected from the corresponding input image, the direction map and the location map to be generated from the corresponding input image. The models are trained by computing a loss representing a degree of difference between their output (i.e., the key-points and the mid-points detected by the mid-point model, the direction map generated by the direction map model, and the location map generated by the location map model) and the ground truth data, and updating trainable parameters of the models based on the computed loss.

<Selection of Key-Point Association Algorithm: S108>

The algorithm selection unit 2060 selects the key-point association algorithm suitable for the target image 10 based on the selection factor (S108). In some embodiment, the algorithm selection unit 2060 may determine the key-point association algorithm based on whether or not a selection factor is larger than a predefined threshold.

Figure 10:
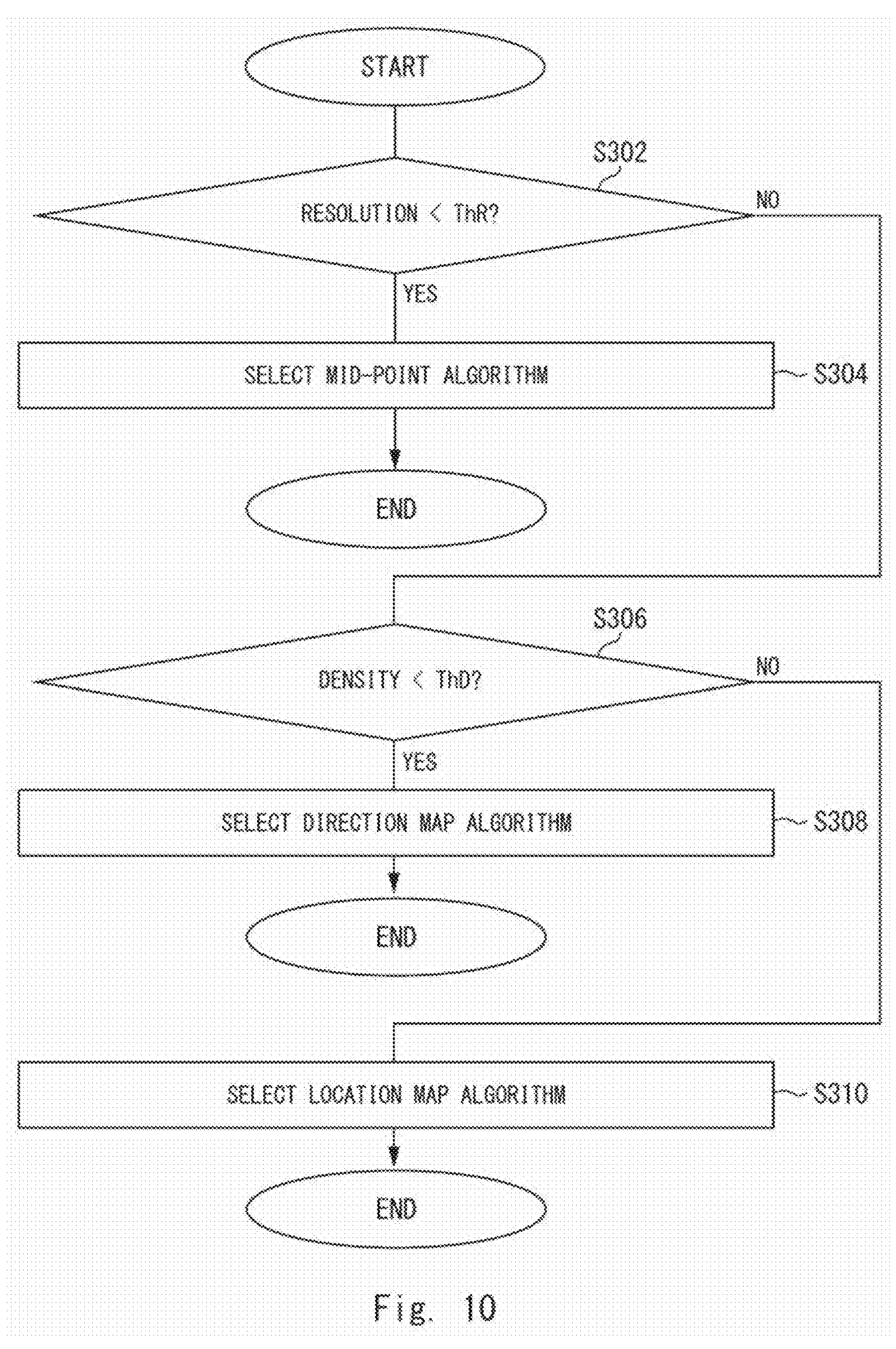
FIG. 10 is a flowchart illustrating a first example flow of processes to select the key-point association algorithm.

FIG. 10 is a flowchart illustrating a first example flow of processes to select the key-point association algorithm. In this example, the predefined key-point algorithms include the mid-point algorithm, direction map algorithm, and the location map algorithm. In addition, in this example, the selection factors include the density of persons in the target image 10 and the resolution of persons in the target image 10.

Specifically, the algorithm selection unit 2060 determines whether or not the resolution of persons in the target image 10 is smaller than a threshold ThR (S302). When the resolution is smaller than the threshold ThR (S302: YES), the algorithm selection unit 2060 selects the mid-point algorithm as the key-point association algorithm to be applied to the target image 10 (S304). On the other hand, when the resolution is not smaller than the threshold ThR (S302: NO), the algorithm selection unit 2060 determines whether or not the density of persons in the target image 10 is smaller than a threshold ThD (S306).

When the density is smaller than the threshold ThD (S306: YES), the algorithm selection unit 2060 selects the direction map algorithm as the key-point association algorithm to be applied to the target image 10 (S308). On the other hand, when the density is not smaller than the threshold ThD (S306: NO), the algorithm selection unit 2060 selects the location map algorithm as the key-point association algorithm to be applied to the target image 10 (S310).

Figure 11:
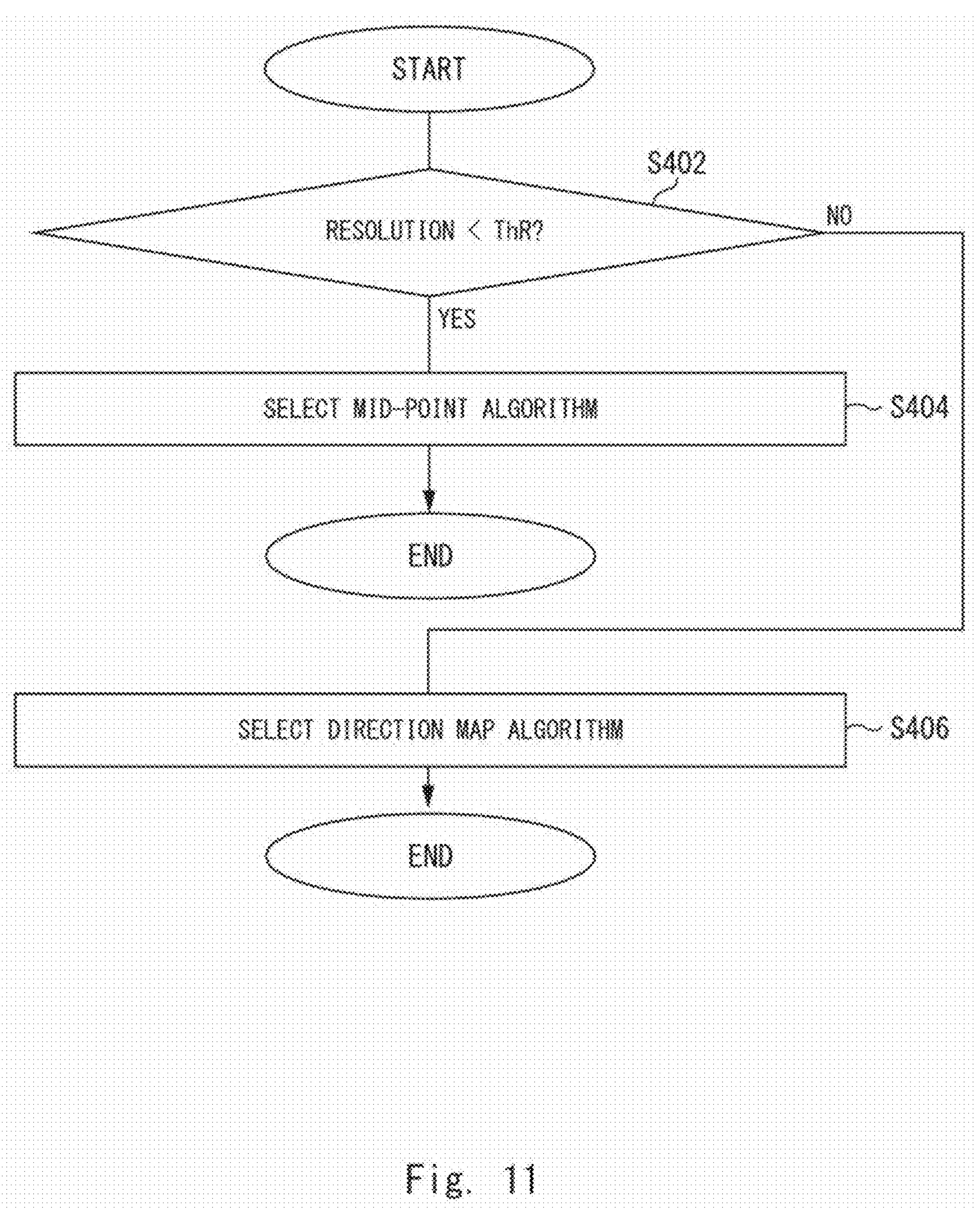
FIG. 11 is a flowchart illustrating a second example flow of processes to select the key-point association algorithm.

FIG. 11 is a flowchart illustrating a second example flow of processes to select the key-point association algorithm. In this example, the predefined key-point algorithms include the mid-point algorithm and direction map algorithm. In addition, in this example, the resolution of persons in the target image 10 is used as the selection factor.

Specifically, the algorithm selection unit 2060 determines whether or not the resolution of persons in the target image 10 is smaller than the threshold ThR (S402). When the resolution is smaller than the threshold ThR (S402: YES), the algorithm selection unit 2060 selects the mid-point algorithm as the key-point association algorithm to be applied to the target image 10 (S404). On the other hand, when the resolution is not smaller than a threshold ThR (S402: NO), the algorithm selection unit 2060 selects the direction map algorithm as the key-point association algorithm to be applied to the target image 10 (S406).

It is noted that, in the example shown by FIG. 11, the location map algorithm may be employed as one of the predefined key-point association algorithms instead of the direction map algorithm. In this case, the algorithm selection unit 2060 selects the location map algorithm as the key-point association algorithm to be applied to the target image 10 when the resolution is not smaller than the threshold ThR.

Figure 12:
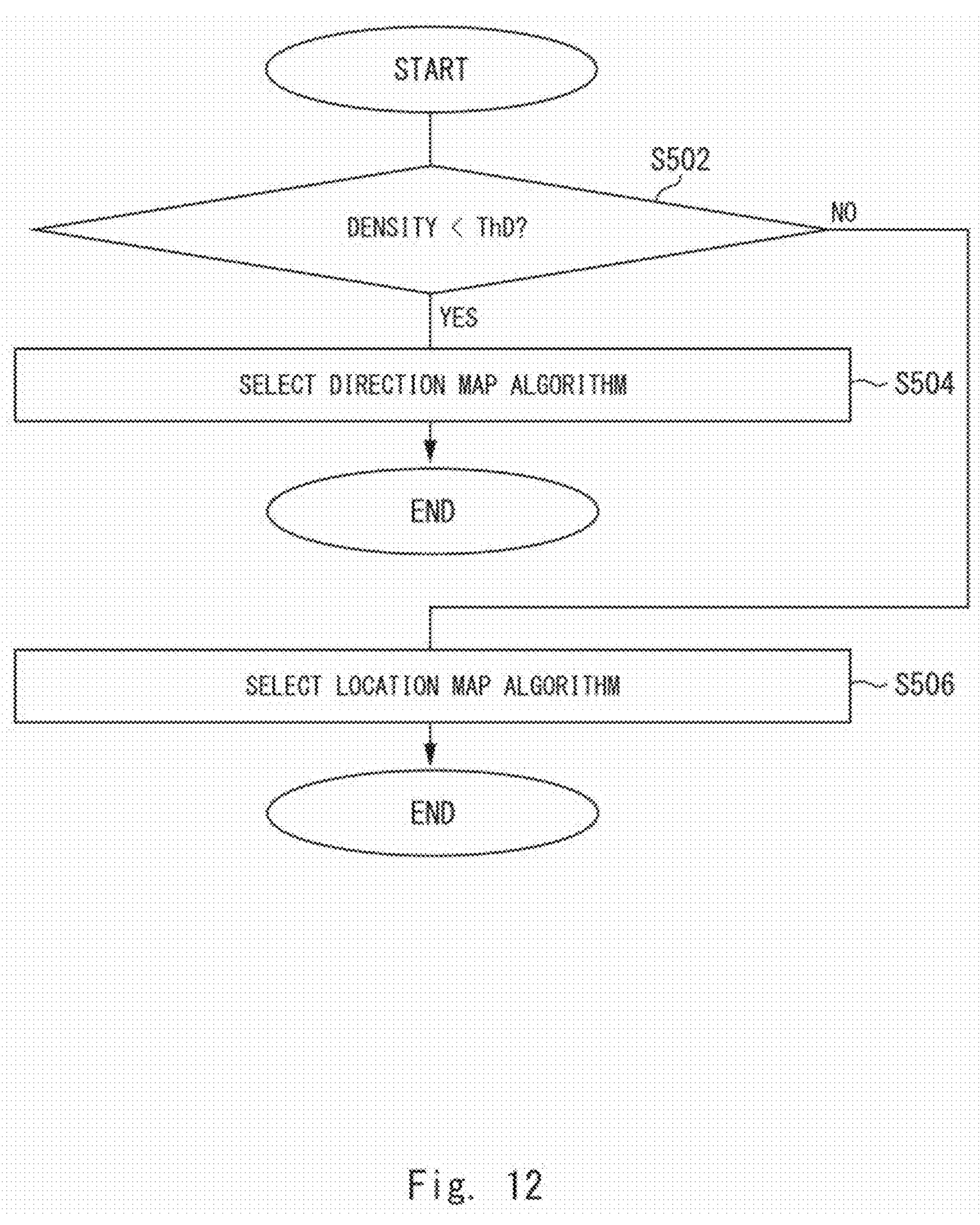
FIG. 12 is a flowchart illustrating a third example flow of processes to select the key-point association algorithm.

FIG. 12 is a flowchart illustrating a third example flow of processes to select the key-point association algorithm. In this example, the predefined key-point algorithms include the direction map algorithm and location algorithm. In addition, in this example, the density of persons in the target image 10 is used as the selection factor.

Specifically, the algorithm selection unit 2060 determines whether or not the density of persons in the target image 10 is smaller than the threshold ThD (S502). When the density is smaller than the threshold ThD (S502: YES), the algorithm selection unit 2060 selects the direction map algorithm as the key-point association algorithm to be applied to the target image 10 (S504). On the other hand, when the density is not smaller than the threshold ThD (S502: NO), the algorithm selection unit 2060 selects the location map algorithm as the key-point association algorithm to be applied to the target image 10 (S506).

It is noted that, in the example shown by FIG. 12, the mid-point algorithm may be employed as one of the predefined key-point association algorithms instead of the direction map algorithm. In this case, the algorithm selection unit 2060 selects the mid-point algorithm as the key-point association algorithm to be applied to the target image 10 when the density is not smaller than the threshold ThD.

<Output from Pose Estimation Apparatus 2000>

The pose estimation apparatus 2000 may be configured to output information (called output information) that shows the result of the pose estimation. For example, the output information may include an identifier (e.g., frame number) of the target image 10 and, for each key-point group, a set of an identifier of the estimated pose for the key-point group and key-point information of each key-point in the key-point group. The identifier of the estimated pose indicates what type of pose is taken by the person corresponding to the key-point group. The key-point information indicates the type (e.g., neck, right shoulder, etc.) and the location (e.g., coordinates) of the key-point.

There are various ways to output the output information. In some implementations, the output information may be put into a storage device, displayed on a display device, or sent to another computer such as a PC or smart phone of the user of the pose estimation apparatus 2000.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Although the present disclosure is explained above with reference to example embodiments, the present disclosure is not limited to the above-described example embodiments. Various modifications that can be understood by those skilled in the art can be made to the configuration and details of the present disclosure within the scope of the invention.

The whole or part of the example embodiments disclosed above can be described as, but not limited to, the following supplementary notes.

<Supplementary Notes>

(Supplementary Note 1)

A pose estimation apparatus comprising:

at least one memory that is configured to store instructions; and at least one processor that is configured to execute the instructions to:

acquire a target image in which one or more persons are captured;

detect key-points from the target image;

compute one or more selection factors based on the key-points, the one or more selection factors including density, resolution, or both of persons in the target image;

select an algorithm for key-point association from predefined algorithms for key-point association based on the one or more selection factors;

perform key-point association on the key-points using the selected algorithm to divide the key-points into one or more key-point groups each of which includes the key-points of a same person as each other; and for each of the key-point groups, estimate a pose of the person corresponding to the key-point group based on the key-points included in the key-point group.

(Supplementary Note 2)

The pose estimation apparatus according to Supplementary Note 1, wherein types of the key-points include right shoulder and left shoulder, and wherein the computation of the density of persons in the target image includes:

for each of the key-points of left shoulder, liking the key-point of left shoulder with the key-point of right shoulder closest thereto;

for each of the key-point of right shoulder that is linked with multiple key-points of left shoulder, deleting a longest link having the key-point of right shoulder when a length of the longest link is more than predetermined times of a length of a shortest link having the key-point of right shoulder; and computing the density of persons in the target image based on a number of the key-points of right shoulder that are linked with multiple key-points of left shoulder.

(Supplementary Note 3)

The pose estimation apparatus according to Supplementary Note 1 or 2, wherein types of the key-points include right shoulder and left shoulder, and wherein the computation of the resolution of persons in the target image includes:

for each of the key-points of left shoulder, liking the key-point of left shoulder with the key-point of right shoulder closest thereto;

for each of the key-point of right shoulder that is linked with multiple key-points of left shoulder, deleting a longest link having the key-point of right shoulder when a length of the longest link is more than predetermined times of a length of a shortest link having the key-point of right shoulder; and computing the resolution of persons in the target image based on a number of the links remained after the deletion and a number of the links whose lengths are less than a threshold that is defined based on one of dimensions of the target image.

(Supplementary Note 4)

The pose estimation apparatus according to any one of Supplementary Notes 1 to 3, wherein the predefined algorithms include mid-point algorithm, direction map algorithm, location map algorithm, or two or three of them.

(Supplementary Note 5)

The pose estimation apparatus according to any one of Supplementary Notes 1 to 4, wherein the selection algorithm for key-point association includes:

determining whether or not the selection factor is less than a threshold of the selection factor;

selecting a first algorithm for key-point association when the selection factor is less than the threshold of the selection factor; and selecting a second algorithm for key-point association when the selection factor is not less than the threshold of the selection factor.

(Supplementary Note 6)

The pose estimation apparatus according to Supplementary Note 5, wherein the selection algorithm for key-point association includes:

determining whether or not the resolution of persons in the target image is less than a threshold of the resolution;

selecting mid-point algorithm when the resolution of persons in the target image is less than the threshold of the resolution; and selecting direction map algorithm or location map algorithm when the resolution of persons in the target image is not less than the threshold of the resolution.

(Supplementary Note 7)

The pose estimation apparatus according to Supplementary Note 5 or 6, wherein the selection algorithm for key-point association includes:

determining whether or not the density of persons in the target image is less than a threshold of the density;

selecting mid-point algorithm or direction map algorithm when the density of persons in the target image is less than the threshold of the density; and selecting location map algorithm when the density of persons in the target image is not less than the threshold of the density.

(Supplementary Note 8)

A pose estimation method performed by one or more computers comprising:

acquiring a target image in which one or more persons are captured;

detect key-points from the target image;

computing one or more selection factors based on the key-points, the one or more selection factors including density, resolution, or both of persons in the target image;

selecting an algorithm for key-point association from predefined algorithms for key-point association based on the one or more selection factors;

performing key-point association on the key-points using the selected algorithm to divide the key-points into one or more key-point groups each of which includes the key-points of a same person as each other; and for each of the key-point groups, estimating a pose of the person corresponding to the key-point group based on the key-points included in the key-point group.

(Supplementary Note 9)

The pose estimation method according to Supplementary Note 8, wherein types of the key-points include right shoulder and left shoulder, and wherein the computation of the density of persons in the target image includes:

for each of the key-points of left shoulder, liking the key-point of left shoulder with the key-point of right shoulder closest thereto;

for each of the key-point of right shoulder that is linked with multiple key-points of left shoulder, deleting a longest link having the key-point of right shoulder when a length of the longest link is more than predetermined times of a length of a shortest link having the key-point of right shoulder; and computing the density of persons in the target image based on a number of the key-points of right shoulder that are linked with multiple key-points of left shoulder.

(Supplementary Note 10)

The pose estimation method according to Supplementary Note 8 or 9, wherein types of the key-points include right shoulder and left shoulder, and wherein the computation of the resolution of persons in the target image includes:

for each of the key-points of left shoulder, liking the key-point of left shoulder with the key-point of right shoulder closest thereto;

for each of the key-point of right shoulder that is linked with multiple key-points of left shoulder, deleting a longest link having the key-point of right shoulder when a length of the longest link is more than predetermined times of a length of a shortest link having the key-point of right shoulder; and computing the resolution of persons in the target image based on a number of the links remained after the deletion and a number of the links whose lengths are less than a threshold that is defined based on one of dimensions of the target image.

(Supplementary Note 11)

The pose estimation method according to any one of Supplementary Notes 8 to 10, wherein the predefined algorithms include mid-point algorithm, direction map algorithm, location map algorithm, or two or three of them.

(Supplementary Note 12)

The pose estimation method according to any one of Supplementary Notes 8 to 11, wherein the selection algorithm for key-point association includes:

determining whether or not the selection factor is less than a threshold of the selection factor;

selecting a first algorithm for key-point association when the selection factor is less than the threshold of the selection factor; and selecting a second algorithm for key-point association when the selection factor is not less than the threshold of the selection factor.

(Supplementary Note 13)

The pose estimation method according to Supplementary Note 12, wherein the selection algorithm for key-point association includes:

determining whether or not the resolution of persons in the target image is less than a threshold of the resolution;

selecting mid-point algorithm when the resolution of persons in the target image is less than the threshold of the resolution; and selecting direction map algorithm or location map algorithm when the resolution of persons in the target image is not less than the threshold of the resolution.

(Supplementary Note 14)

The pose estimation method according to Supplementary Note 12 or 13, wherein the selection algorithm for key-point association includes:

determining whether or not the density of persons in the target image is less than a threshold of the density;

selecting mid-point algorithm or direction map algorithm when the density of persons in the target image is less than the threshold of the density; and selecting location map algorithm when the density of persons in the target image is not less than the threshold of the density.

(Supplementary Note 15)

A non-transitory computer-readable storage medium storing a program that causes one or more computers to execute:

acquiring a target image in which one or more persons are captured;

detect key-points from the target image;

computing one or more selection factors based on the key-points, the one or more selection factors including density, resolution, or both of persons in the target image;

selecting an algorithm for key-point association from predefined algorithms for key-point association based on the one or more selection factors;

performing key-point association on the key-points using the selected algorithm to divide the key-points into one or more key-point groups each of which includes the key-points of a same person as each other; and for each of the key-point groups, estimating a pose of the person corresponding to the key-point group based on the key-points included in the key-point group.

(Supplementary Note 16)

The storage medium according to Supplementary Note 15, wherein types of the key-points include right shoulder and left shoulder, and wherein the computation of the density of persons in the target image includes:

for each of the key-points of left shoulder, liking the key-point of left shoulder with the key-point of right shoulder closest thereto;

for each of the key-point of right shoulder that is linked with multiple key-points of left shoulder, deleting a longest link having the key-point of right shoulder when a length of the longest link is more than predetermined times of a length of a shortest link having the key-point of right shoulder; and computing the density of persons in the target image based on a number of the key-points of right shoulder that are linked with multiple key-points of left shoulder.

(Supplementary Note 17)

The storage medium according to Supplementary Note 15 or 16, wherein types of the key-points include right shoulder and left shoulder, and wherein the computation of the resolution of persons in the target image includes:

for each of the key-points of left shoulder, liking the key-point of left shoulder with the key-point of right shoulder closest thereto;

for each of the key-point of right shoulder that is linked with multiple key-points of left shoulder, deleting a longest link having the key-point of right shoulder when a length of the longest link is more than predetermined times of a length of a shortest link having the key-point of right shoulder; and computing the resolution of persons in the target image based on a number of the links remained after the deletion and a number of the links whose lengths are less than a threshold that is defined based on one of dimensions of the target image.

(Supplementary Note 18)

The storage medium according to any one of Supplementary Notes 15 to 17, wherein the predefined algorithms include mid-point algorithm, direction map algorithm, location map algorithm, or two or three of them.

(Supplementary Note 19)

The storage medium according to any one of Supplementary Notes 15 to 18, wherein the selection algorithm for key-point association includes:

determining whether or not the selection factor is less than a threshold of the selection factor;

selecting a first algorithm for key-point association when the selection factor is less than the threshold of the selection factor; and selecting a second algorithm for key-point association when the selection factor is not less than the threshold of the selection factor.

(Supplementary Note 20)

The storage medium according to Supplementary Note 19, wherein the selection algorithm for key-point association includes:

determining whether or not the resolution of persons in the target image is less than a threshold of the resolution;

selecting mid-point algorithm when the resolution of persons in the target image is less than the threshold of the resolution; and selecting direction map algorithm or location map algorithm when the resolution of persons in the target image is not less than the threshold of the resolution.

(Supplementary Note 21)

The storage medium according to Supplementary Note 19 or 20, wherein the selection algorithm for key-point association includes:

determining whether or not the density of persons in the target image is less than a threshold of the density;

selecting mid-point algorithm or direction map algorithm when the density of persons in the target image is less than the threshold of the density; and selecting location map algorithm when the density of persons in the target image is not less than the threshold of the density.

REFERENCE SIGNS LIST

10 target image
22 key-point of right shoulder
24 key-point of left shoulder
1000 computer
1020 bus
1040 processor

1060 memory
1080 storage device
1100 input/output interface
1120 network interface
2000 pose estimation apparatus
2020 acquisition unit
2040 key-point detection unit
2060 algorithm selection unit
2080 key-point association unit
2100 estimation unit

What is claimed is:

1. A pose estimation apparatus comprising:
at least one memory that is configured to store instructions; and
at least one processor that is configured to execute the instructions to:
acquire a target image in which one or more persons are captured;
detect key-points from the target image;
compute one or more selection factors based on the key-points, the one or more selection factors including density, resolution, or both of persons in the target image;
select an algorithm for key-point association from predefined algorithms for key-point association based on the one or more selection factors;
perform key-point association on the key-points using the selected algorithm to divide the key-points into one or more key-point groups each of which includes the key-points of a same person as each other; and
for each of the key-point groups, estimate a pose of the person corresponding to the key-point group based on the key-points included in the key-point group.

2. The pose estimation apparatus according to claim 1,
wherein types of the key-points include right shoulder and left shoulder, and
wherein the computation of the density of persons in the target image includes:
for each of the key-points of left shoulder, liking the key-point of left shoulder with the key-point of right shoulder closest thereto;
for each of the key-point of right shoulder that is linked with multiple key-points of left shoulder, deleting a longest link having the key-point of right shoulder when a length of the longest link is more than predetermined times of a length of a shortest link having the key-point of right shoulder; and
computing the density of persons in the target image based on a number of the key-points of right shoulder that are linked with multiple key-points of left shoulder.

3. The pose estimation apparatus according to claim 1,
wherein types of the key-points include right shoulder and left shoulder, and
wherein the computation of the resolution of persons in the target image includes:
for each of the key-points of left shoulder, liking the key-point of left shoulder with the key-point of right shoulder closest thereto;
for each of the key-point of right shoulder that is linked with multiple key-points of left shoulder, deleting a longest link having the key-point of right shoulder when a length of the longest link is more than predetermined times of a length of a shortest link having the key-point of right shoulder; and
computing the resolution of persons in the target image based on a number of the links remained after the deletion and a number of the links whose lengths are less than a threshold that is defined based on one of dimensions of the target image.

4. The pose estimation apparatus according to claim 1,
wherein the predefined algorithms include mid-point algorithm, direction map algorithm, location map algorithm, or two or three of them.

5. The pose estimation apparatus according to claim 1, wherein the selection algorithm for key-point association includes:
determining whether or not the selection factor is less than a threshold of the selection factor;
selecting a first algorithm for key-point association when the selection factor is less than the threshold of the selection factor; and
selecting a second algorithm for key-point association when the selection factor is not less than the threshold of the selection factor.

6. The pose estimation apparatus according to claim 5,
wherein the selection algorithm for key-point association includes:
determining whether or not the resolution of persons in the target image is less than a threshold of the resolution;
selecting mid-point algorithm when the resolution of persons in the target image is less than the threshold of the resolution; and
selecting direction map algorithm or location map algorithm when the resolution of persons in the target image is not less than the threshold of the resolution.

7. The pose estimation apparatus according to claim 5,
wherein the selection algorithm for key-point association includes:
determining whether or not the density of persons in the target image is less than a threshold of the density;
selecting mid-point algorithm or direction map algorithm when the density of persons in the target image is less than the threshold of the density; and
selecting location map algorithm when the density of persons in the target image is not less than the threshold of the density.

8. A pose estimation method performed by one or more computers comprising:
acquiring a target image in which one or more persons are captured;
detect key-points from the target image;
computing one or more selection factors based on the key-points, the one or more selection factors including density, resolution, or both of persons in the target image;
selecting an algorithm for key-point association from predefined algorithms for key-point association based on the one or more selection factors;
performing key-point association on the key-points using the selected algorithm to divide the key-points into one or more key-point groups each of which includes the key-points of a same person as each other; and
for each of the key-point groups, estimating a pose of the person corresponding to the key-point group based on the key-points included in the key-point group.

9. The pose estimation method according to claim 8,
wherein types of the key-points include right shoulder and left shoulder, and
wherein the computation of the density of persons in the target image includes:

for each of the key-points of left shoulder, liking the key-point of left shoulder with the key-point of right shoulder closest thereto;

for each of the key-point of right shoulder that is linked with multiple key-points of left shoulder, deleting a longest link having the key-point of right shoulder when a length of the longest link is more than predetermined times of a length of a shortest link having the key-point of right shoulder; and computing the density of persons in the target image based on a number of the key-points of right shoulder that are linked with multiple key-points of left shoulder.

10. The pose estimation method according to claim 8, wherein types of the key-points include right shoulder and left shoulder, and wherein the computation of the resolution of persons in the target image includes:

for each of the key-points of left shoulder, liking the key-point of left shoulder with the key-point of right shoulder closest thereto;

for each of the key-point of right shoulder that is linked with multiple key-points of left shoulder, deleting a longest link having the key-point of right shoulder when a length of the longest link is more than predetermined times of a length of a shortest link having the key-point of right shoulder; and computing the resolution of persons in the target image based on a number of the links remained after the deletion and a number of the links whose lengths are less than a threshold that is defined based on one of dimensions of the target image.

11. The pose estimation method according to claim 8, wherein the predefined algorithms include mid-point algorithm, direction map algorithm, location map algorithm, or two or three of them.

12. The pose estimation method according to claim 8, wherein the selection algorithm for key-point association includes:

determining whether or not the selection factor is less than a threshold of the selection factor;

selecting a first algorithm for key-point association when the selection factor is less than the threshold of the selection factor; and selecting a second algorithm for key-point association when the selection factor is not less than the threshold of the selection factor.

13. The pose estimation method according to claim 12, wherein the selection algorithm for key-point association includes:

determining whether or not the resolution of persons in the target image is less than a threshold of the resolution;

selecting mid-point algorithm when the resolution of persons in the target image is less than the threshold of the resolution; and selecting direction map algorithm or location map algorithm when the resolution of persons in the target image is not less than the threshold of the resolution.

14. The pose estimation method according to claim 12, wherein the selection algorithm for key-point association includes:

determining whether or not the density of persons in the target image is less than a threshold of the density;

selecting mid-point algorithm or direction map algorithm when the density of persons in the target image is less than the threshold of the density; and selecting location map algorithm when the density of persons in the target image is not less than the threshold of the density.

15. A non-transitory computer-readable storage medium storing a program that causes one or more computers to execute:

acquiring a target image in which one or more persons are captured;

detect key-points from the target image;

computing one or more selection factors based on the key-points, the one or more selection factors including density, resolution, or both of persons in the target image;

selecting an algorithm for key-point association from predefined algorithms for key-point association based on the one or more selection factors;

performing key-point association on the key-points using the selected algorithm to divide the key-points into one or more key-point groups each of which includes the key-points of a same person as each other; and for each of the key-point groups, estimating a pose of the person corresponding to the key-point group based on the key-points included in the key-point group.

16. The storage medium according to claim 15, wherein types of the key-points include right shoulder and left shoulder, and wherein the computation of the density of persons in the target image includes:

for each of the key-points of left shoulder, liking the key-point of left shoulder with the key-point of right shoulder closest thereto;

for each of the key-point of right shoulder that is linked with multiple key-points of left shoulder, deleting a longest link having the key-point of right shoulder when a length of the longest link is more than predetermined times of a length of a shortest link having the key-point of right shoulder; and computing the density of persons in the target image based on a number of the key-points of right shoulder that are linked with multiple key-points of left shoulder.

17. The storage medium according to claim 15, wherein types of the key-points include right shoulder and left shoulder, and wherein the computation of the resolution of persons in the target image includes:

for each of the key-points of left shoulder, liking the key-point of left shoulder with the key-point of right shoulder closest thereto;

for each of the key-point of right shoulder that is linked with multiple key-points of left shoulder, deleting a longest link having the key-point of right shoulder when a length of the longest link is more than predetermined times of a length of a shortest link having the key-point of right shoulder; and computing the resolution of persons in the target image based on a number of the links remained after the deletion and a number of the links whose lengths are less than a threshold that is defined based on one of dimensions of the target image.

18. The storage medium according to claim 15, wherein the predefined algorithms include mid-point algorithm, direction map algorithm, location map algorithm, or two or three of them.

19. The storage medium according to claim 15, wherein the selection algorithm for key-point association includes:

determining whether or not the selection factor is less than a threshold of the selection factor;

selecting a first algorithm for key-point association when the selection factor is less than the threshold of the selection factor; and selecting a second algorithm for key-point association when the selection factor is not less than the threshold of the selection factor.

20. The storage medium according to claim 19, wherein the selection algorithm for key-point association includes:

determining whether or not the resolution of persons in the target image is less than a threshold of the resolution;

selecting mid-point algorithm when the resolution of persons in the target image is less than the threshold of the resolution; and selecting direction map algorithm or location map algorithm when the resolution of persons in the target image is not less than the threshold of the resolution.

* * * * *